United States Patent [19]

Ito et al.

[11] Patent Number: 4,534,640

[45] Date of Patent: Aug. 13, 1985

[54] EXPOSURE CONTROL SYSTEM FOR A CAMERA HAVING A DIGITAL COMPUTER

[75] Inventors: Tadashi Ito; Yasuo Isobe; Fumio Ito, all of Kanagawa; Soichi Nakamoto, Tokyo, all of Japan

[73] Assignee: Canon Kabushiki Kaisha, Japan

[21] Appl. No.: 664,924

[22] Filed: Oct. 24, 1984

Related U.S. Application Data

[63] Continuation of Ser. No. 608,914, May 10, 1984, abandoned, which is a continuation of Ser. No. 398,807, Jul. 16, 1982, abandoned, which is a continuation of Ser. No. 027,776, Apr. 6, 1979, abandoned, which is a continuation of Ser. No. 882,182, Feb. 28, 1978, abandoned, which is a continuation of Ser. No. 696,440, Jun. 15, 1976, abandoned, which is a continuation of Ser. No. 519,629, Oct. 31, 1974, abandoned.

[30] Foreign Application Priority Data

| Nov. 1, 1973 | [JP] | Japan | 48-123010 |
| Dec. 10, 1973 | [JP] | Japan | 48-139760 |
| Dec. 25, 1973 | [JP] | Japan | 49-1216 |

[51] Int. Cl.$^3$ .................. G03B 7/085; G03B 17/00
[52] U.S. Cl. ........................... 354/448; 354/289.12
[58] Field of Search ................. 354/448, 289.12

[56] References Cited

U.S. PATENT DOCUMENTS

| 3,605,583 | 9/1971 | Ort et al. ................ 354/43 |
| 3,833,913 | 9/1974 | Wick et al. .............. 354/42 |
| 3,987,460 | 10/1976 | Ueda et al. .............. 354/43 |
| 4,034,383 | 7/1977 | Mashimo et al. ........ 354/43 |
| 4,054,887 | 10/1977 | Holle et al. ............. 354/43 |
| 4,075,641 | 2/1978 | Uno et al. ............... 354/60 R |

Primary Examiner—Russell E. Adams
Attorney, Agent, or Firm—Toren, McGeady, Stanger, Goldberg & Kiel

[57] ABSTRACT

An exposure control system for a photographic camera of the type provided with a shutter preselection automatic exposure range and a diaphragm preselection automatic exposure range, wherein various exposure control parameters are digitized and applied to a digital computer for providing either shutter interval or diaphragm aperture control signals. For exposure control in the shutter preselection automatic exposure range, there are provided a signal generator associated with the camera diaphragm mechanism, an analog-to-digital converter cooperative therewith for providing digital signals corresponding to ever varying aperture sizes as the diaphragm mechanism is operated from its fully open position, and a comparator connected between said computer and converter upon detection of coincidence of the signal from the computer with one of the signals from the converter to provide a diaphragm mechanism arresting signal. Further, the invention provides various types of non-contact device usuable as the diaphragm information generator.

7 Claims, 23 Drawing Figures

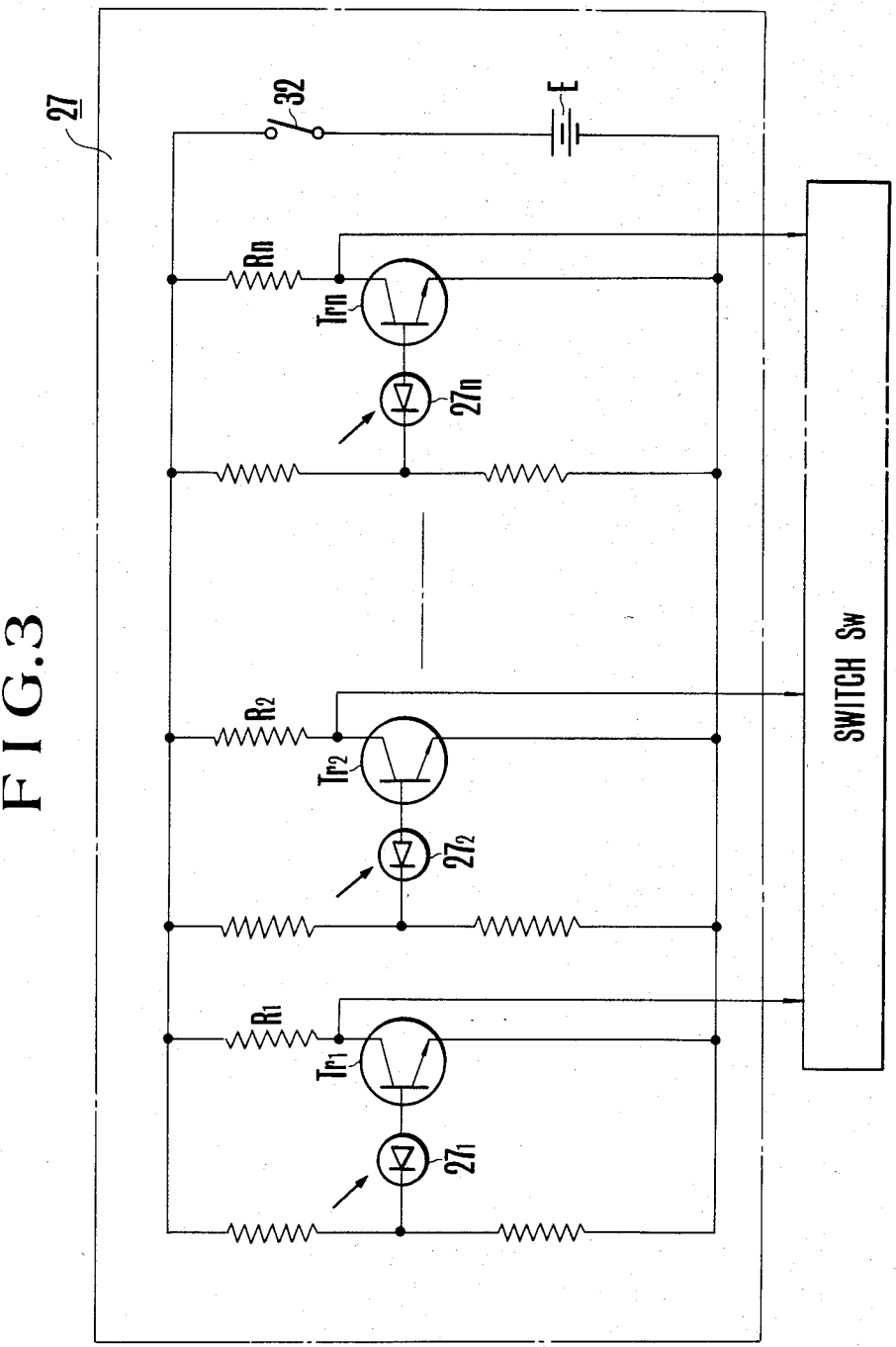
F I G. 3

EXPOSURE CONTROL SYSTEM FOR A CAMERA HAVING A DIGITAL COMPUTER

This is a continuation of application Ser. No. 608,914, filed May 10, 1984, which was a continuation of application Ser. No. 398,807, filed July 16, 1982, which was a continuation of application Ser. No. 027,776, filed Apr. 6, 1979, which was a continuation of application Ser. No. 882,182, filed Feb. 28, 1978, which was a continuation of application Ser. No. 696,440, filed June 15, 1976, which was a continuation of application Ser. No. 519,629, filed Oct. 31, 1974, all now abandoned.

BACKGROUND OF THE INVENTION

1. Field of the Invention

This invention relates to exposure control apparatus for cameras, and more particularly to an exposure control apparatus for a photographic camera having a diaphragm mechanism adjustable in accordance with an output signal provided by a digital computer.

2. Description of the Prior Art

In general, the method of adjusting the diaphragm mechanism of a camera by use of an output pulse signal produced from an exposure value computing circuit, the magnitude of the signal being dependent upon the preselected shutter speed, film speed and photometric value, can be realized in an exposure control apparatus employing either a pulse motor, or a direct-current motor associated with a digital-to-analog converter responsive to the output pulse from the exposure value computing circuit. Such exposure control apparatus, however, are not suited for incorporation in cameras because of the awkward size and power of the presently-available pulse motor, or D. C. motor, and the difficult problem of availability of the electric power source suitable therefor. Further, in order to introduce various exposure control parameters into the exposure value computing circuit, there has been provided in most cases, contact makers such as variable resistors and mechanical switches arranged to be operable as the exposure control parameter setting means. For this reason, troubles due to the wearing-out and insufficient contacting of the contact makers are liable to arise.

SUMMARY OF THE INVENTION

A first object of the invention is to provide a method of adjusting the diaphragm mechanism so as to provide an effective exposure aperture in conformance with a preselected shutter time by use of a signal comparator arranged, upon detection of coincidence of the output signal from a digital computer with one of the signals corresponding to varying aperture sizes as the diaphragm mechanism is operated from its fully open position, to provide an exposure aperture control signal which is used to arrest the diaphragm mechanism.

A second object of the invention is to provide an exposure control apparatus employing the method described above and adapted for use in a camera of the type provided with a shutter preselection automatic exposure range and a diaphragm preselection automatic exposure range, wherein selection of the exposure ranges is effected by the provision of a circuit transfer switch.

A third object of the invention is to provide an exposure control apparatus employing non-contact devices as the exposure control parameter setting means.

A fourth object of the invention is to provide an exposure control apparatus wherein a manually operable shutter speed selection dial is associated with a signal generator upon setting the dial to a desired shutter speed position to generate a digital signal corresponding thereto.

Other objects and features of the invention will become apparent from the following description taken in conjunction with the accompanying drawings in which:

BRIEF DESCRIPTION OF THE DRAWINGS

FIG. 3 is a circuit diagram of the non-contact assembly of FIGS. 2(a) and 2(c).

DESCRIPTION OF THE PREFERRED EMBODIMENTS

Figure 1:
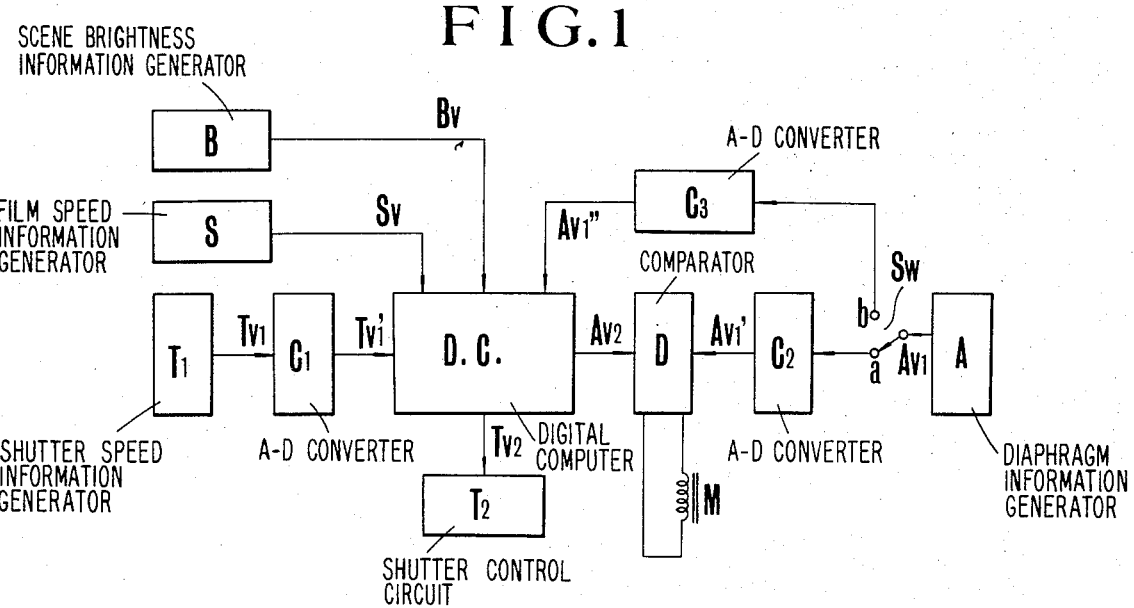
FIG. 1 is a block diagram of one embodiment of an exposure control system in accordance with the present invention.

Referring to FIG. 1, one embodiment of an exposure control system adapted for use in a photographic camera of the type provided with a shutter preselection automatic exposure range and a diaphragm preselection automatic exposure range in accordance with the present invention is illustrated as including a scene brightness information generator B, for example, a sensor circuit including a photosensitive element, capable of producing a digital signal BV corresponding to the level of brightness of a scene being photographed, a film speed information generator S capable of producing a digital signal SV corresponding to the speed rating of the associated photographic film, a shutter speed information generator $T_1$ for producing an analog signal $Tv_1$ proportional to the preselected shutter speed, a first analog-to-digital converter $C_1$ connected to the generator $T_1$ for converting the analog signal $Tv_1$ to a digital operation circuit such as a digital signal $Tv'_1$, and a digital computer D.C. into which these digital signals BV, SV and $Tv'_1$ are applied to derive an exposure aperture control digital signal $Av_2$. A shutter interval control digital signal $Tv_2$ also is provided from the computer D.C. and is applied to a shutter control circuit $T_2$ associated with the camera shutter mechanism. The system further includes a diaphragm information generator A associated with the camera diaphragm mechanism to produce analog signals $Av_1$ proportional to exposure aperture sizes as the diaphragm mechanism operates from its fully open position, a second analog-to-digital converter $C_2$ which is selected for connection to the generator A for converting the analog signals $Av_1$ to respective digital signals $Av'_1$ through a circuit transfer switch SW for selection of the shutter preselection and diaphragm preselection automatic exposure ranges when the switch SW is set to its "a" position for exposures in the shutter preselection automatic exposure range, a third analog-to-digital converter $C_3$ which is selected for connection to the generator A when the switch SW is set to its "b" position for exposures in the diaphragm preselection automatic exposure range, and a comparator D connected between the outputs of computer D.C. and converter $C_2$ upon detection of the relative magnitudes of the digital signals $Av_2$ and $Av'_1$ provided respectively therefrom to produce an output which is applied to an electromagnet M for actuation thereof. When the switch SW is set to the "b" position, the generator A is connected to the third converter $C_3$ which produces digital signals $Av''_1$ which are applied to the computer D.C. to derive shutter interval control signals.

The operation of the system of FIG. 1 is as follows. For an exposure in the shutter preselection automatic exposure range, the camera diaphragm mechanism is manually set to its "auto" position, thereupon the switch SW is set to its "a" position by a control pin cooperating with the manually operable ring of the diaphragm mechanism. Next, the shutter speed selecting dial is turned to select a desired shutter speed, thereupon the shutter speed information generator $T_1$ produces an analog signal $Tv_1$ which is then converted by the converter $C_1$ to a digital signal $Tv'_1$ and is applied to computer D.C. Responsive to the digital signals BV, SV and $Tv'_1$ the computer D.C. produces a digital signal $Av_2$ which is applied to one of the two input terminals of the comparator D. When the two-step shutter release button of the camera is depressed to the first step, the diaphragm mechanism is brought into operation, so that the exposure aperture begins to continuously decrease from the maximum size in a range of available exposure apertures. Thereby, the generator A produces ever varying analog signals $Av_1$ and accordingly the converter $C_2$ produces digital signals corresponding to varying aperture sizes in sequence which are applied to the other input terminal of the comparator D, in which the digital signal $Av_2$ from the computer D.C. is compared with each of the digital signal $Av'_1$ from the converter $C_2$. When the difference between the signals $Av_2$ and $Av'_1$ has reached a predetermined level, or become zero, the comparator D produces an output by which the electromagnet M is actuated for energization, thereupon the variable aperture means in the diaphragm mechanism is arrested to provide an effective exposure aperture which determines a correct exposure value in conformance with the preselected shutter speed. Upon further depression of the shutter release button from the first step to the second step, the shutter mechanism is actuated and the exposure interval is controlled by the circuit $T_2$ in accordance with the signal $Tv_2$ from the computer D.C. It is to be noted that the exposure control in the shutter preselection automatic exposure range generally results in $Tv_1=Tv_2$. In order to improve the accuracy of the exposure control, however, a modification may be made in such manner that when the electromagnet M is actuated, the switch SW is set from its "a" position to its "b" position causing the computer D.C. to recompute the shutter interval in conformance with the resultant effective exposure aperture. Such an exposure control will sometimes result in $Tv_1 \neq Tv_2$.

For an exposure in the diaphragm preselection automatic exposure range, the diaphragm mechanism is set from its "Auto" position to a desired aperture value position, thereupon the switch SW is set from the "a" position to the "b" position by the control pin and an analog signal $Av_1$ from the generator A cooperating with the diaphragm mechanism is applied to the converter $C_3$ which then produces a digital signal $Av_1$. Responsive to the digital signals $AV''_1$, BV and SV, the computer D.C. derives a shutter interval control signal $Tv_2$ which is applied to the shutter control circuit $T_2$, thereby the camera shutter mechanism is controlled to effect a correct exposure.

Figure 2B:
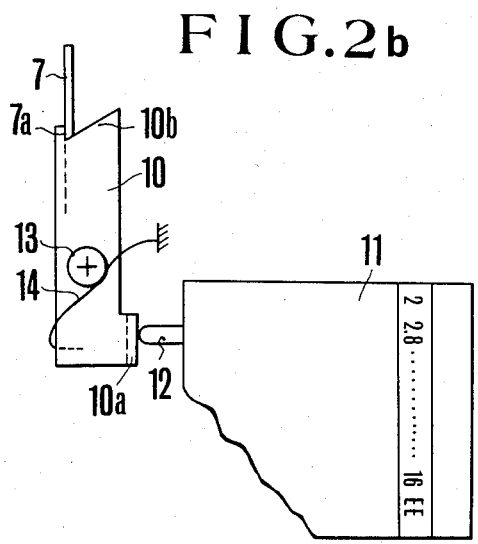
FIG. 2(b) is a fragmentary side elevational view of the arrangement of FIG. 2(a) taken as looking in the direction of arrow X.
Figure 2C:
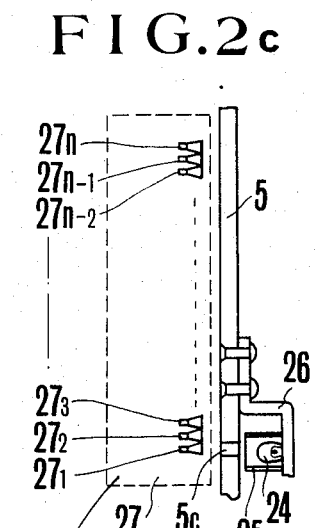
FIG. 2(c) is a fragmentary sectional view of the arrangement of FIG. 2(a) taken as looking in the direction of arrow Y.
Figure 2A:
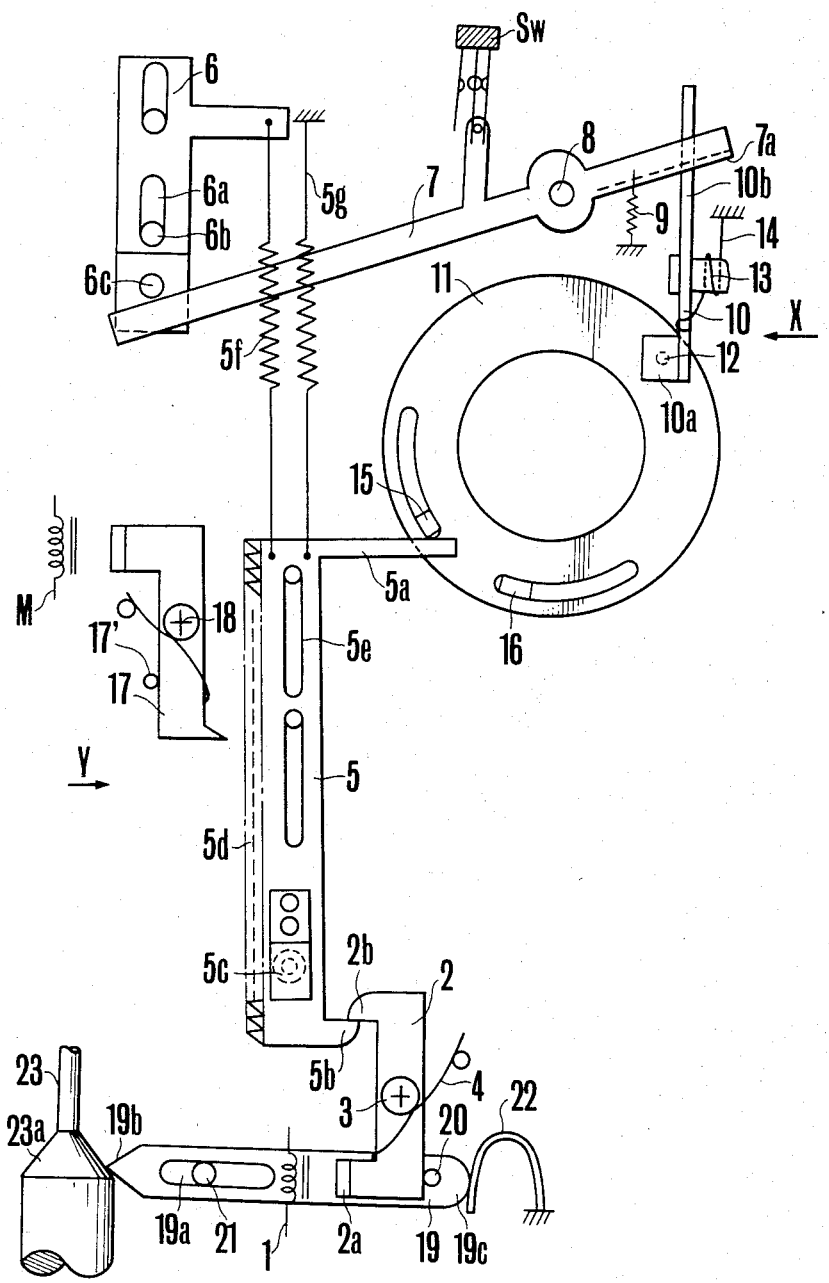
FIG. 2(a) is a schematic elevational view of the essential components of a diaphragm mechanism associated with a non-contact assembly of a diaphragm information generator and an analog-to-digital converter suitable for use in the system of FIG. 1.

An exposure control apparatus incorporated in a photographic camera in accordance with the invention is shown in FIGS. 2(a), 2(b) and 2(c) in a normal position ready for an exposure in the shutter preselection automatic exposure range after the shutter has been cocked, with a diaphragm mechanism 11 in its fully open position, an exposure range selecting mechanism, and a diaphragm information generator 5 employing a light-scanning type non-contact device, the remaining parts non-essential for the understanding of the invention having been omitted for purposes of clarity. The diaphragm mechanism 11 comprises a diaphragm presetting lever 15 associated with variable aperture means and an automatic diaphragm control lever 16 which will be described in more detail in connection with FIG. 4. The exposure range selecting mechanism includes a circuit-transfer switch SW corresponding to that of FIG. 1, a motion-transmitting lever 7 which is fulcrumed at a pivot pin 8 and which is biased by a helical spring 9 which is stronger than a spring 5f in a clockwise direction, and an actuating lever 10 having at one end a rectangularly bent portion 10a against which the control pin 12 cooperating with a manually operable diaphragm ring 29 (FIG. 4) abuts as shown in FIG. 2(b) and having at the other end a sloped cam surface 10b on which the lever end 7a rides under the force of the spring 9, so that when the control pin 12 is retracted from the position shown in FIG. 2(b), the lever 10 is turned about a pin 13 under the force of a tension spring 14 which is stronger than the spring 9 in a counterclockwise direction as viewed in FIG. 2(b), causing the lever 7 to turn in the counter-clockwise direction against the force of the spring 9. The opposite arm of lever 17 to the arm 7a abuttingly engages a pin 6c fixedly mounted on a slide 6 having longitudinally elongated slots 6a in which respective guide pins 6b are engaged, and which is downwardly biased by a helical spring 5f connected between an extension of slide 6 and one end portion of a slide 5. Cooperating with the slide 6, there is provided a rod 23 having a tapered portion 23a against which a tapered portion 19b of a lock-releasing slide 19 abuts under the force of a tension spring 22, one end of which is mounted on the camera housing, so that when the slide 6 is moved downwards, the rod 23 is moved to the left as guided by a pin 21 engaging a slot 19a provided in the slide 19 to turn a locking lever 2 about its pivot pin 3 in a clockwise direction against the force of a tension spring 4 in engagement with a pin 20 fixedly mounted on the slide 19. Such a pivoting movement of the lever 2 results in the disengagement of a pawl 2b of lever 2 from an extension 5b of the slide 5. The energization of an electromagnet 1 also causes this engagement. The slide 5 is arranged to be manually and automatically movable as guided by a guide pins engaging in respective slots 5e provided through the slide plate thereof, constituting part of the diaphragm information generating means and serving as a member for setting the variable aperture means to a preselected setting through intermediary of the lever 15. The slide 5 is provided with a toothed portion 5d formed therein on one side along its entire length for cooperation with the arresting means in the form of a lever 17 with an electromagnet M. The lever 17 is pivoted at a pin 18 and is biased by a spring in a clockwise direction until it abuts a stopper 17'. The electromagnet M is positioned adjacent one end of the lever 17 so that when it is energized, the lever 17 is turned in a counter-clockwise direction causing a pawl of the lever 17 to engage one of the teeth 5d.

As shown in FIG. 2(c), the slide 5 is provided with an illumination assembly comprising a lamp 24 and a hood 25 for the lamp 24 mounted on a lamp support 26 in alignment with a hole 5c provided through the slide 5. Arranged on the opposite side of the slide 5 to the lamp 24 are a number of photosensitive elements $27_1$ through $27_n$ mounted in a space within the diaphragm mechanism so that light passing through the hole 5c from the energized lamp 24 scans the photosensitive elements 27 as the slide 5 moves upwards along with the diaphragm presetting lever 15.

FIG. 3 shows a practical example of the circuit incorporating the photosensitive elements 27 of FIG. 2, the circuit corresponding to the circuit of the diaphragm information generator of FIG. 1, wherein photovoltaic cells are employed as the photosensitive elements 27 and are connected in the respective base circuits of n transistors $Tr_1$ through $Tr_n$ connected in parallel with each other and with a battery E. The collector electrodes of the transistors $Tr_1$ through $Tr_n$ are connected to a common switch SW and are connected to the positive bus of the battery E through respectively weighted resistors $R_1$ through $R_n$. In order to prevent more than one of the transistors from being rendered conducting at a time, the circuit parameters are selected so that only when a maximum light energy is applied to the photovoltaic cells, the transistors are rendered conducting.

Figure 4:
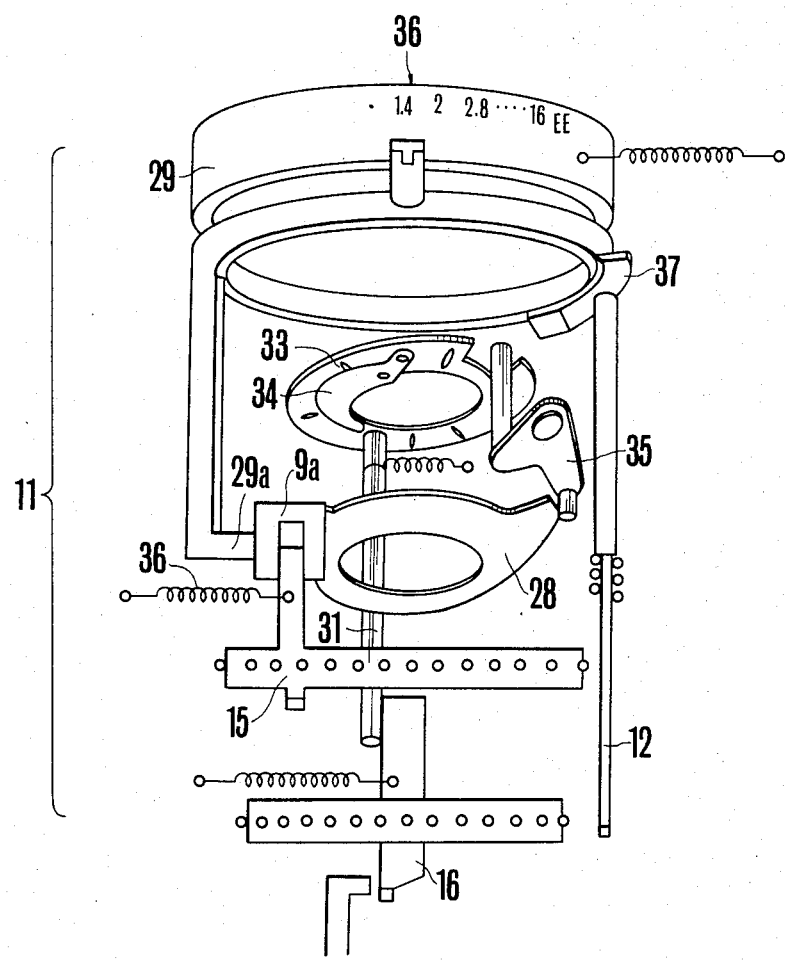
FIG. 4 is a fragmentary schematic partly perspective partly sectional view of the essential components of an interior structure of the lens barrel of FIG. 2(a) and 2(b).

FIG. 4 shows an arrangement of the basic parts of the diaphragm mechanism 11 of FIG. 2. In the arrangement, there is provided a diaphragm control cam 28 rotatable about an optical axis of the camera objective lens and either cooperating with the diaphragm control ring 29 as well as the diaphragm presetting lever 15 in engagement of parts 29a and 9a with each other when the ring 29 is turned to place a desired aperture value graduation in registry with an index mark 36, or cooperating only with the diaphragm presetting lever 15 when the ring 29 is turned to place the symbol EE in registry with the index mark 36 because of the disengagement of the parts 29a and 9a from each other, thereby the position of the cam 28 is adjusted by the lever 15. The motion of the cam 28 is transmitted through a bell crank 36 to a variable aperture ring member 33 carrying diaphragm blades 34 thereby the size of exposure aperture is controlled in accordance with the angular position of the cam 28. The variable aperture ring member 33 has a post 32 engaging the automatic diaphragm control lever 16 so that the post 31 follows the lever 16 as the lever 16 moves to the left, thereby the ring 33 is turned to adjust the exposure aperture size to a value dependent upon the position of the cam 28. When the diaphgram ring 29 is turned to place symbol EE in registry with the index 36, the control pin 12 is caused to protrude by a cam lobe 37 connected to the diaphragm ring 29, so that the cam 28 is permitted to assume a position for providing the maximum aperture size until the diaphragm presetting lever 15 is operated. When the diaphragm ring 29 is turned to place symbol EE out of registration with the index 36, the control pin 12 is retracted.

The operation of the exposure control apparatus described above for an exposure in the shutter preselection automatic exposure range is as follows. At first, the camera operator turns the diaphragm ring 29 to place the symbol EE in registry with the index 36, thereupon the pin 12 protrudes to turn the lver 10 about the pivot pin 13 in the clockwise direction, causing the lever 7 to turn about the pivot pin 8 in the clockwise direction under the force of the spring 9 to lift up the slide 6 against the force of the spring 5f to the uppermost position as shown in FIG. 2(a) and simultaneously the movable contact of the switch SW is brought into contact with the fixed contact, a. Next, upon depression of the two-stage shutter release button until the first stage, the power switch is turned on to illuminate the lamp 24 and to render operative the computer D.C. Responsive to the digital signals BV, SV and Tv'$_1$, the computer D.C. produces an output as the exposure aperture control signal Av$_2$ which is applied to the comparator D. At a time the signal Av$_2$ is produced, the magnet 1 is energized to lock the rear curtain of the focal plane shutter in its open position and to attract the arm 2a of the lever 2, so that the extension 5b of slide 5 is disengaged from the pawl 2b of lever 2. Such a disengagement permits the slide 5 to move upwards under the force of the springs 5f and 5g as guided by the pin-and-slot assembly 5e, during which the light passing through the hole 5c from the lamp 24 scans the photosensitive elements 27 in sequence, while moving the diaphragm presetting lever 15. Responsive to the sequential outputs presented from the circuit of FIG. 3, the gates of the converter $C_2$ are gated on in sequence. Upon coincidence between the signal $Av_2$ from the computer D.C. and the signal $Av'_1$ from the converter $C_2$, the magnet M is energized to turn the lever 17 in the counter-clockwise direction so that the pawl of the lever 7 is brought into engagement with one tooth of the toothed portion 5d of the slide 5, thereby the slide 5 is arrested in a position where the lever 15 adjusts the position of the diaphragm control cam 28 so as to provide an effective exposure aperture in conformance with the preselected shutter time for making a correct exposure. Next the shutter release button is depressed from the first stage to the second stage, a mirror is move from its viewing position to its nonviewing position, the automatic diaphragm control lever 16 is operated to control the area of exposure aperture opening defined by the diaphragm blades 34 in accordance with the position of the cam 28 preset by the lever 15 through the bell crank 35, and the front curtain of the focal plane shutter runs down. The signal $Tv_2$ appearing at another output terminal of the computer D.C. is applied to the shutter control circuit $T_2$. After the preselected shutter interval from the running down of the front curtain, the electromagnet 1 is de-energized, thereupon the lever 2 is turned in the counter-clockwise direction until it abuts the pin 20, and the rear curtain runs down to terminate the duration of the shutter interval. After the rear curtain has run down, the mirror returns to its viewing position, and the diaphragm mechanism assumes its fully open position. Further, upon release of the shutter release button from the depression, the power switch is turned off, thereupon the electromagnet M is de-energized to disengage the pawl of lever 17 from the toothed portion 5c of slide 5 under the force of spring 18. Such a disengagement results in the upward movement of the slide 5 along with the lever 15 under the force of springs 5f and 5g. When the shutter is cocked, the slide 5 is moved by a not shown mechanism to the downmost position where it is locked by the lever 2 and simultaneously, the lever 15 follows the projection 5a of slide 5 to its downmost position as shown in FIG. 2(a).

The operation of the apparatus for an exposure in the diaphragm preselection automatic exposure range is as follows. The operator turns the diaphragm ring 29 to place a graduation representing his desired aperture value in registry with the index 36, thereupon the control pin 12 is retracted from the position shown in FIG. 2(b) to permit the lever 10 to be turned under the force of a spring 14 in the counter-clockwise direction as viewed in FIG. 2(b), while the lever 7 is turned in the counter-clockwise direction as the tapered portion 7a slides upwards on the cam surface 10b to move away the movable contact of the switch SW from the fixed contact "a" and to bring it into contact with the fixed contact "b". Such a pivotal movement of the lever 7 causes the downward movement of the slide 6 and the rod 23 under the force of spring 5f until the pin 6c is slipped down from the end of lever 7. As the rod 23 moves downwards, the slide 19 is caused to moved to the left, thereby the lever 2 is turned in the clockwise direction to disengage the pawl 2b from the projection 5b, so that the slide 5 is permitted to move upwards under the force of springs 5f and 5g which are not so strong as to move the lever 15 until the projection 5a abuts against the lever end 15 of which the position is automatically adjusted when the diaphragm ring 29 is set to a preselected aperture value setting. After the setting of ASA sensitivity of the used film, the shutter release button is depressed to turn on the power switch, thereupon the lamp 24 is lighted. The light from the lamp 24 passes through the hole 5c, impinging upon one of the photosensitive elements 27. The output from the circuit of FIG. 3 is applied through the switch SW to the converter $C_3$ which then produces a digital signal $Av''_1$. Responsive to the digital signals Bv, Sv and $Av''_1$, the computer D.C. produces an exposure aperture control signal $Av_2$ as well as a shutter interval control signal $Tv_2$. As mentioned above, when the power switch is turned on, the electromagnet 1 is energized to lock the rear curtain in its open position, and to attract the arm 2a of the lever. In this case, however, this attraction has no effect on the slide 5, unlike the attraction effected in the shutter preselection automatic exposure range, because the pawl 2b of lever 2 has been already disengaged from the extension 5b of slide 5. When the shutter release button is depressed from the first stage to the second stage, the mirror is moved from its viewing position to the non-viewing position, the automatic diaphragm control lever 16 operates to adjust the area of opening of the exposure aperture in conformance to the preselected aperture value, and the front curtain runs down. After a time interval determined by the shutter interval control signal $Tv_2$ derived from the computer D.C. from the initiation of running-down of the front curtain, the electromagnet 1 is de-energized causing the rear curtain to run down, thereby the duration of the shutter interval is terminated. After the rear curtain has run down, the mirror is caused to return to its viewing position in a manner known in the art, and the diaphragm mechanism is permitted to assume its fully open position. Upon release of the shutter button from the depression, the power switch is turned off. When the shutter is cocked, the slide 5 is moved by the not shown mechanism to its downmost position. But when the cocking of the shutter is completed, the slide 5 is permitted to move again to the position where it abuts the lever end 15. Thus, one cycle of the diaphragm preselection automatic exposure control operation is completed.

In order to set the exposure control apparatus from such a final condition of the exposure operation in the diaphragm preselection automatic exposure range to the initial condition of the exposure operation in the shutter preselection automatic exposure range, the diaphragm ring 29 is turned to place symbol EE in registry with the index 36, thereupon the slide 6 and rod 23 are moved to their uppermost positions, and the movable contact of the switch SW is brought into contact with the fixed contact "a". The upward movement of the rod 23 causes the slide 19 to move to the right, thereby the lever 2 is turned in the counter-clockwise direction to the position where the pawl 2b is engageable with the extension 5b of slide 5. At the same time, the slide 5 is moved to its uppermost position under the force of springs 5f and 5g along with the diaphragm presetting lever 15. Then, the slide 5 is manually moved to the downmost position, where the extension 5b is engaged with the pawl 2b of the lever 2, while the lever 15 is moved to the downmost position under the force of a spring provided in the diaphragm mechanism as the lever end 15 follows the projection 5a of slide 5. Thus the exposure control apparatus is set to the normal position shown in FIG. 2(a) ready for exposure operation in the shutter preselection automatic exposure range.

Figure 5A:
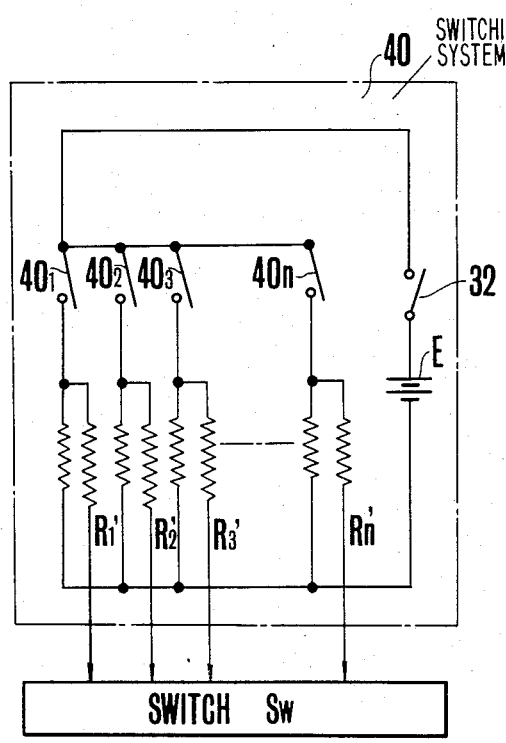
FIG. 5(a) is a circuit diagram of a contact type device incorporated in a diaphragm information generator, the device being usable in place of the non-contact type device of FIG. 3.
Figure 5B:
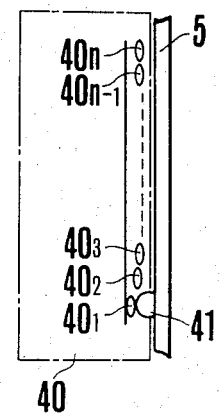
FIG. 5(b) is a fragmentary schematic side elevational view of the device of FIG. 5(a).

In the above mentioned example of the embodiment, a light scanning system 27 comprising a slide 5 and photosensitive elements $27_1$ through $27_n$ is employed as a means for converting diaphragm information into electrical signals. However, this invention is not confined thereto. For example, it is possible to use a switching system 40 comprising a slide 5 and mechanical switch elements $40_1$ through $40_n$ arranged as shown in FIG. 5(a). In order to adapt the slide 5 to the arrangement of the switch elements, there is provided an electrically insulated hump 41 arranged on the slide 5 to actuate the switches element $40_1$ through $40_n$ in sequence as the slide 5 moves along with the diaphragm presetting lever 15. The switch elements are connected respectively by weighted resistors to the switch SW.

Figure 6A:
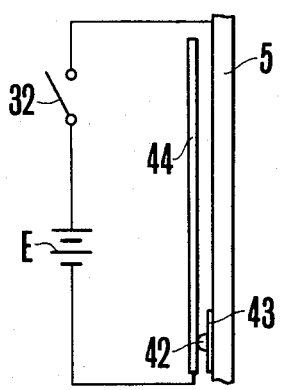
FIG. 6(a) shows the diaphragm information generator.
Figure 6B:
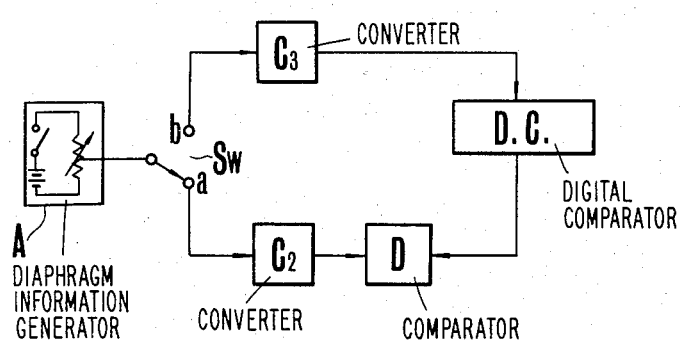
FIG. 6(b) is a block diagram illustrating a method of incorporating the device of FIG. 6(a) in the system of FIG. 1.

Further, instead of using the light-scanning system 27, it is possible to use a bleeder system employing a rheostat incorporated in a battery circuit as shown in FIG. 6(a), wherein a slider 42 is mounted on the slide 5 and is arranged to be slidable on a resistor 44 connected through a switch 23 to a battery E. As shown in FIG. 6(b), the slider 42 is connected through the switch SW to either the converter $C_2$, or the converter $C_3$, the converter $C_2$ being connected to the comparator D, and the converter $C_3$ being connected to digital computer D.C. These analog-to-digital converters $C_2$ and $C_3$ may be replaced by comparison detector circuits disclosed in Japanese Patent Publication No. Sho 48-1800. The comparison detector circuit is constructed so that the output from the bleeder system when applied to the circuit gates one of the gates thereof, thereby the signal passing through the gate is applied to the next step circuit. Instead of using the bleeder system, it is possible to use a single photosensitive element arranged to receive the light entering through the camera diaphragm aperture. In this case, the output from the photosensitive element is varied with exposure aperture size, and, therefore, it can be used after digitaled.

Figure 7:
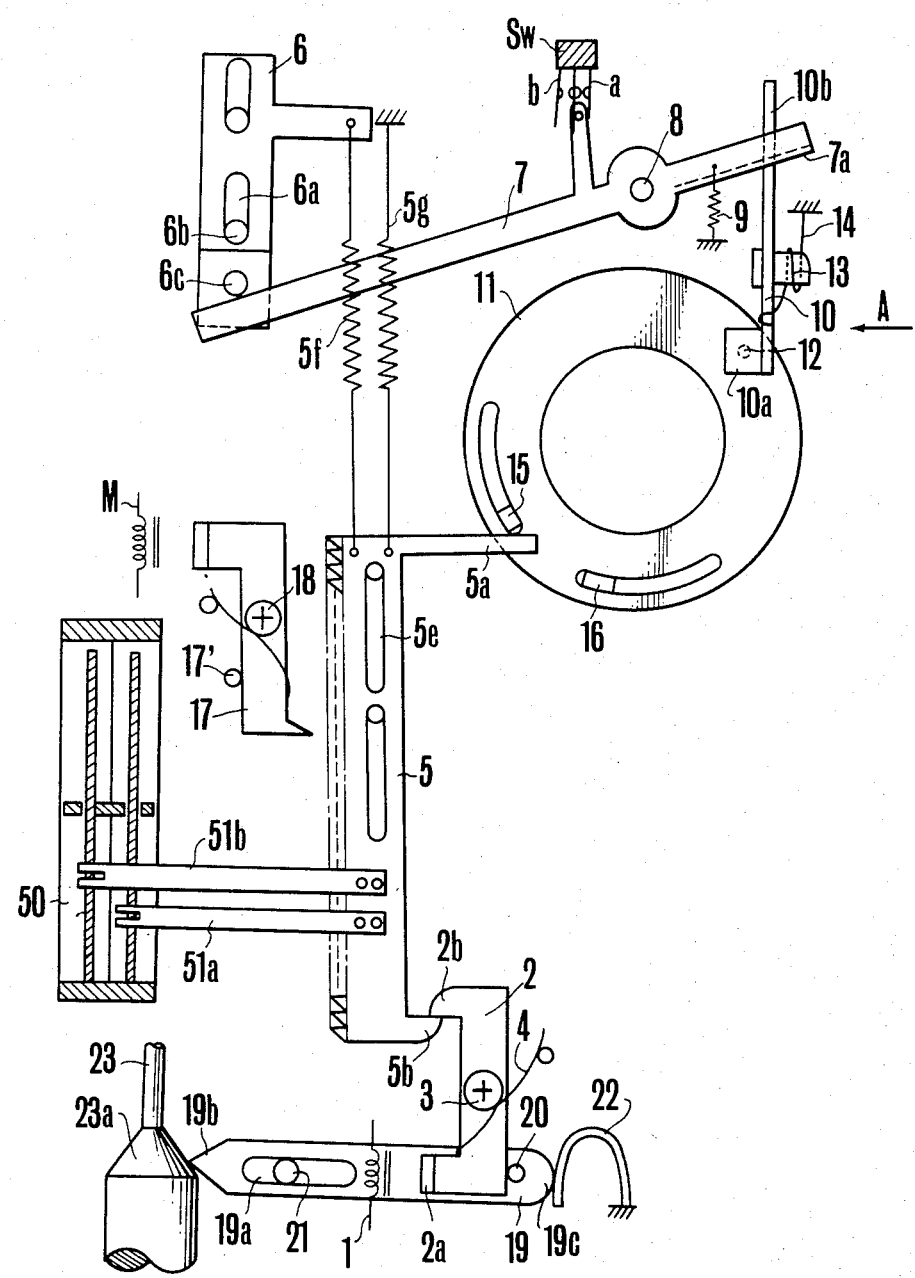
FIG. 7 is a schematic elevational view of the essential components of a diaphragm mechanism of FIG. 2(a) associated with a magnetic type non-contact incorporated in a diaphragm information generator suitable for use in the system of FIG. 1.

FIG. 7 shows a modification of the exposure control apparatus of FIG. 2 by employing another type non-contact device utilizing the magnetic reluctance effect as the light-scanning type non-contact device. This magnetic type non-contact device 50 is incorporated in the diaphragm information generator A shown in FIG. 1. The device 50 comprises a pair of movable contact members 51a and 51b fixedly mounted on the slide 5 and having at their free ends respective magnet elements, and a magnetic reluctance element stationary during the operation of the slide 5. The output from the device 50 is applied to the circuit-transfer switch SW for selection of the exposure ranges. Therefore, when the lever 2 is turned in the clockwise direction to effect the disangagement of the extension 5b of slide 5 from the pawl 2b, the slide 5 is moved upwards under the force of springs 5f and 5g. Such an upward movement of the slide 5 causes a variation of the reluctivity of the device 50, so that the device 50 provides outputs corresponding to the exposure aperture sizes which are then applied to either converter $C_2$ or converter $C_3$ in response to a selection of the operative positions of switch SW.

Figure 8:
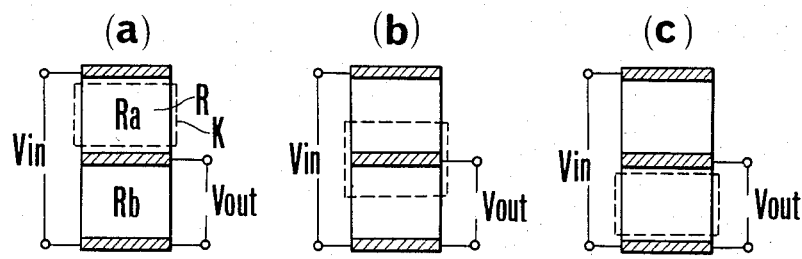
FIGS. 8(a), 8(b) and 8(c) are elevational views illustrating the operating principles of the non-contact device of FIG. 7 utilizing the magnetic reluctance effect.

FIG. 8 illustrates the principle of variation of the reluctivity of the magnetic type non-contact device. Now assuming that, a voltage, $V_{in}$, is applied between two spaced electrodes of a reluctance element R, and an output voltage, $V_{out}$, is produced between one of the two electrodes and an intermediate electrode positioned at the center between the two electrodes, a magnet K having a certain magnetic flux and a length equal to a half length of element R is moved along element R. When the magnet K is aligned with the upper half portion Ra of element R, the ratio of the output voltage to the input voltage, i.e. $V_{out}/V_{in}$ is at minimum, because of Ra>Rb. As the magnet K is moved downwards, Ra is decreased and Rb is increased. When the magnet K is aligned with the center portion of element R, $V_{out}/V_{in}$ becomes equal to one half, because of Ra=Rb. When the magnet K is aligned with the lower half portion Rb of element R, $V_{out}/V_{in}$ reaches a maximum level, the output voltage being almost equal to the input voltage. It is to be understood that this arrangement of the relucance R and the magnet K acts as a linear potentionmeter as the magnet K is displaced with respect to the reluctance R.

Figure 9A:
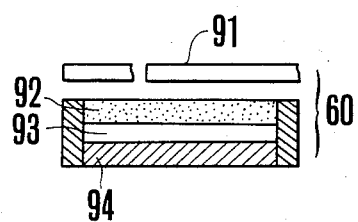
FIG. 9(a) is an enlarged sectional view of a non-contact device using a photoconductive element.
Figure 9B:
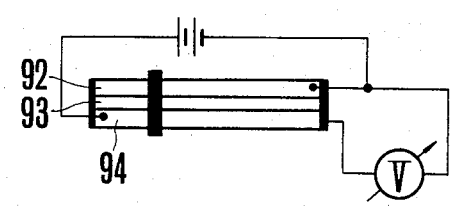
FIG. 9(b) is a circuit diagram of the non-contact device of FIG. 9(a).

FIG. 9 shows still another type non-contact device utilizing the photoconductive effect. The photoconductive type non-contact device that is indicated at 60 comprises a photoconductive layer C sandwiched between a resistance layer B and an electrode layer D, and a mask having a slit and arranged to be movable with respect to the photoconductive layer C. When a light beam is projected through the slit onto the photoconductive layer C, that portion of the photoconductive layer C which is exposed to the light beam is rendered conducting, serving as a slider incorporated in a circuit shown in FIG. 9(b). As the slit is moved along with the mask mounted on the slide 5, varying outputs are produced from the device being indicated by a potentiometer V.

Figure 10:
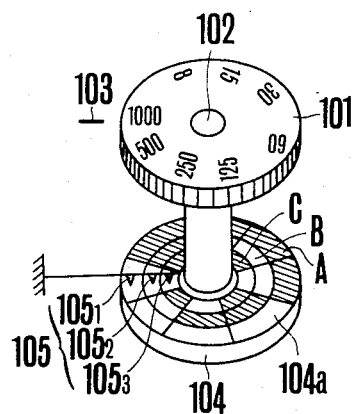
FIG. 10 is a perspective view of a shutter dial provided with a shutter information generator according to the invention.
Figure 11:
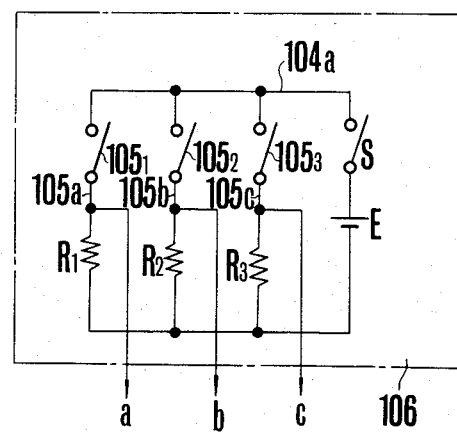
FIG. 11 is a circuit diagram of the shutter information generator of FIG. 10.

FIG. 10 shows an example of the shutter speed setting means adapted for incorporation in the shutter speed information generator $T_1$ of FIG. 1. The shutter speed setting means is constructed as including a shutter dial 101 and a code plate 104 coaxially mounted on a common shaft 102. This assembly is arranged in the camera housing to be manually rotatable for registration of each of the graduations indicative of the available shutter speeds with a stationary index 103 provided on the camera housing. The upper surface of the code plate 104 is provided with conductive patterns indicated by hatching and insulated patterns indicated by blank arranged in a manner as shown in FIG. 10. The conductive patterns are connected through a switch S to the positive terminal of a battery E as shown in FIG. 11. Three sliders $105_1$, $105_2$ and $105_3$ are radially arranged to contact with respective circular tracks with arcuate patterns A, B and C, and are connected through respective resistors $R_1$, $R_2$ and $R_3$ to the negative terminal of the battery E, serving as output terminals of a shutter speed setting circuit 106. This arrangement with the circuit corresponds to a combination of the shutter speed information generator and the analog-to-digital converter $C_1$ of FIG. 1. When the shutter dial 101 is turned to place a graduation, for example, 1000, i.e., 1/1000 second, with the index 3, all of the sliders are brought into contact with the insulated patterns. For this reason, all of the output terminals a, b and c provide "0" signals. When a shutter speed of 1/125 is set, the output terminals a, b and c provide a "1" signal, a "1" signal and a "0" signal respectively. The other different shutter speeds settings are associated with different combinations of coded outpus as shown in the following table.

| Shutter speed | A | B | C |
| --- | --- | --- | --- |
| 1/1000 | 0 | 0 | 0 |
| 1/500 | 0 | 0 | 1 |
| 1/250 | 0 | 1 | 0 |
| 1/125 | 0 | 1 | 1 |
| 1/60 | 1 | 0 | 0 |
| 1/30 | 1 | 0 | 1 |
| 1/15 | 1 | 1 | 0 |
| ⅛ | 1 | 1 | 1 |

This arrangement of the insulated and conductive arcuate patterns with three circular tracks provides eight different combinations of coded signals. Of cource, it is possible to increase the number of different combinations by increasing the number of circular tracks and the number of arcuate patterns in each track, if an increase in the number of available shutter speed is desired. Further, this principle of construction of the shutter speed setting means is applicable to the film speed setting means with a slight modification.

Figure 12A:
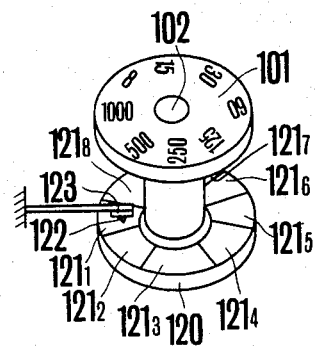
FIG. 12(a) is a perspective view illustrating a first variation of the arrangement of FIG. 10.
Figure 12B:
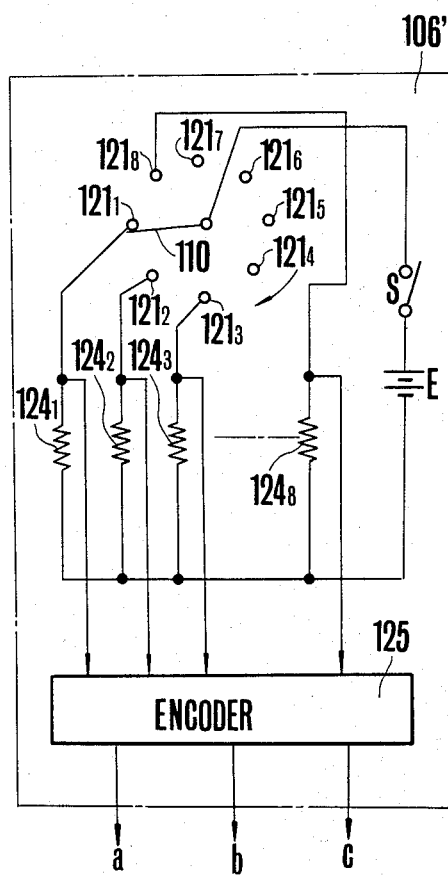
FIG. 12(b) is a circuit diagram of the arrangement of FIG. 12(a).

Instead of using the code plate for association with the shutter dial, it is possible to use a switching plate as shown in FIG. 12(a) for association with a circuit as shown in FIG. 12(b). The switching plate 120 and the shutter dial 101 are coaxially mouned on a common shaft 102. The switching plate 120 has an upper surface provided with eight electric terminals $121_1$ through $121_8$ arranged in a circular track. A slider 122 is arranged to be slidable on the track of the terminals 121, and is fixedly mounted on a bar extending from the camera housing as electrically insulated therefrom by an insulator 123. These eight terminals 121 are connected through respective resistors 124 to the negative terminal of a battery E, while the slider 122 is connected to the positive terminal of the battery E through a switch S. Also the terminals 121 are connected to an encoder 125, so that when the shutter dial is set to a preselected setting, the slide 122 is brought into contact with one of the terminals 121 and the output from the selected terminal 121 is applied to the encoder 125 in which it is coded.

Figure 13A:
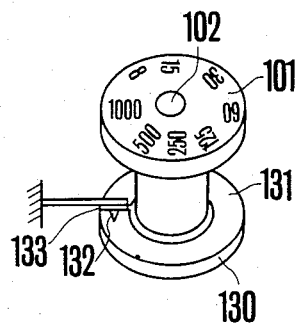
FIG. 13(a) is a perspective view illustrating a second variation of the arrangement of FIG. 10.
Figure 13B:
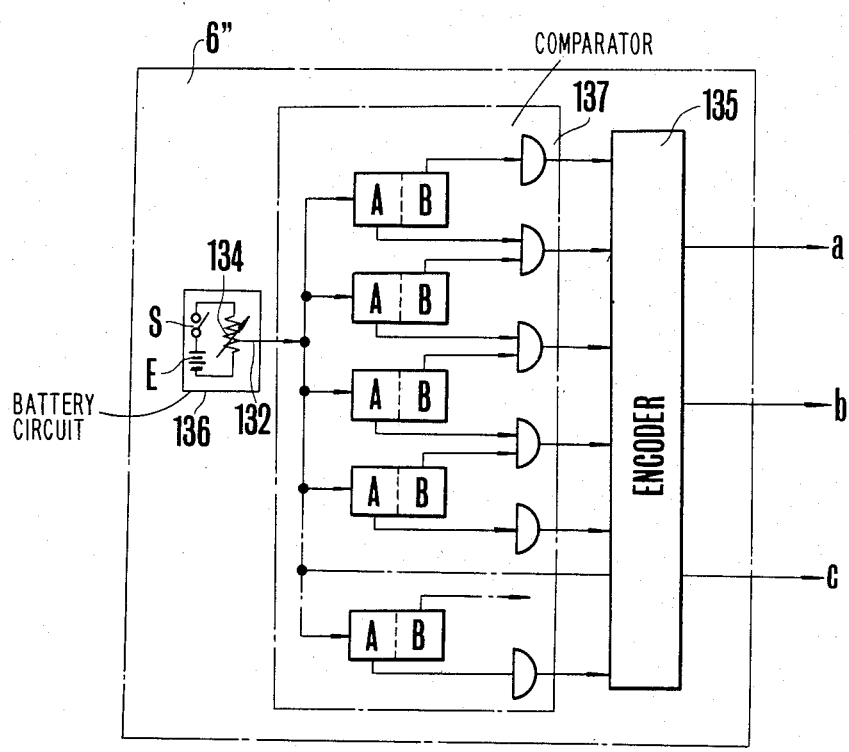
FIG. 13(b) is a circuit diagram of the arrangement of FIG. 13(a).

Furthermore, instead of using the code plate, it is possible to use a bleeder of a construction shown in FIG. 13(a). The bleeder that is indicated at 134 comprises a resistor plate 130 rotatable as a unit together with the shutter dial 101 and having a C-shape resistance surface 131, and a slider 132 arranged to be slidable on the resistance surface 131. This slider 132 is fixedly mounted on a bar extending from the camera housing as electrically insulated therefrom by an insulator 133. The bleeder 134 is incorporated in a battery circuit 136 and connected to a comparator circuit 137 disclosed in Japanese Patent Publication No. Sho 48-180 as shown in FIG. 13(b). When the shutter dial 101 is set to a preselected setting, the bleeder 134 provides in output corresponding to the preselected shutter speed which is applied through the comparator circuit 137 to the encoder 135 in which it is coded.

Figure 14:
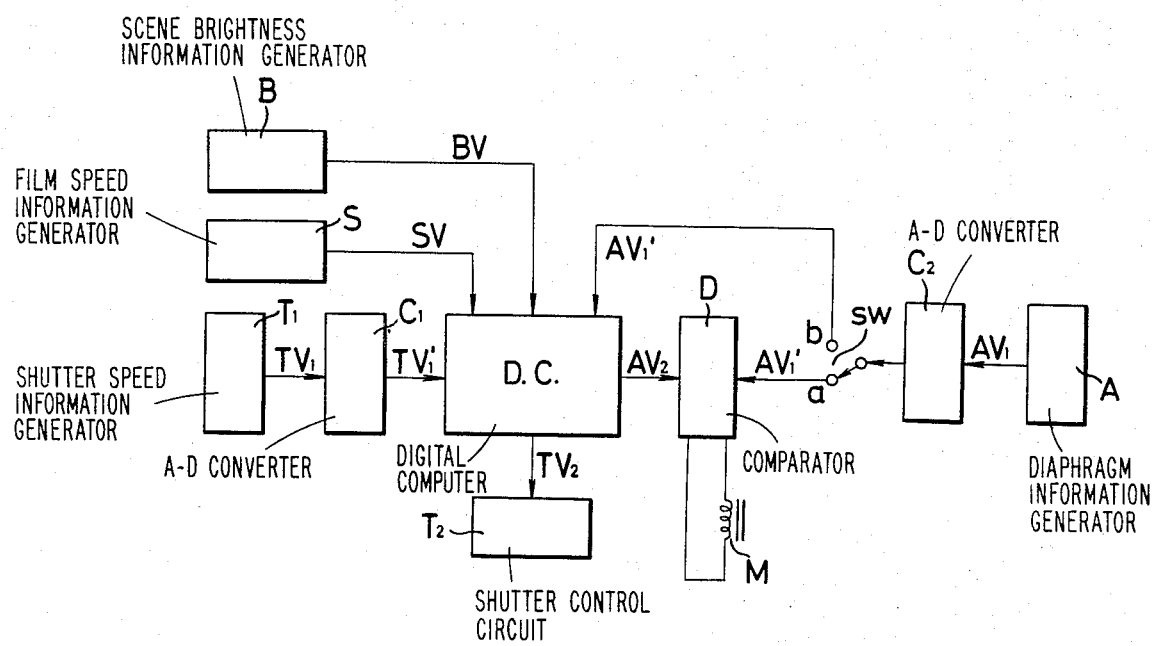
FIG. 14 is a block diagram illustrating another example of the embodiment of FIG. 1.

FIG. 14 shows a modification of the exposure control system of FIG. 1, where the converter $C_3$ is omitted, and instead the switch SW is inserted between the converter $C_2$ and the comparator D or computer D.C., so that the when the camera is set for exposure in the shutter preselection automatic exposure range, the switch SW operates to transmit the digital signal $Av'_1$ to the comparator D, and when the camera is set for exposure in the diaphragm preselection automatic exposure range, it operates to transmit the signal to the computer D.C.

It will be seen from the foregoing description that the present invention contemplates the use of a digital signal comparator arranged in an exposure control apparatus to compare the exposure aperture control signal derived from the digital computer with the digital signals corresponding to the occurring exposure aperture sizes upon detection of coincidence therebetween for providing an output which actuate the diaphragm control mechanism of the camera, thereby an effective exposure aperture is determined in conformance with the preselected shutter speed, thus the conventional drawbacks attendant on the drive motor and its power source can be eliminated. Further, the provision of the circuit-transfer switch permits the exposure control system to operate with a camera of the type provided with a shutter preselection automatic exposure range and a diaphragm preselection automatic exposure range. Furthermore, the employment of non-contact devices as the exposure control parameter setting means increases the reliability of the exposure control apparatus because of the elimination of insufficient contact between the slidable members due to the wearing-out thereof.

What is claimed is:

1. An aperture information input device for a camera which compares a computed aperture value signal obtained through exposure computation with a preset aperture signal representing a preset aperture value to be adjusted and which determines the aperture of a photograph taking lens when the difference between the two signals reaches a predetermined value, the aperture information input device comprising:

a diaphragm device provided with a diaphragm and diaphragm aperture preset means;

adjusting means for adjusting the preset aperture value of the diaphragm aperture preset means, the adjusting means being arranged to operate in response to a release action of the camera;

aperture signal generating means for generating a signal corresponding to the degree of adjustment effected by said adjusting means, the aperture signal generating means including:

(a) a magnetic reluctance element;

(b) a magnet measuring in length about one half of the length of said magnetic reluctance element, the magnet being interlocked with said adjusting means to move on the magnetic reluctance element in response to the operation of the adjusting means;

(c) input terminals provided at both ends of said magnetic reluctance element for receiving a voltage input applied thereto; and (d) output terminals provided in the middle part and one end of said magnetic reluctance element for producing a voltage output as an aperture signal, the voltage output becoming the lowest when said magnet is at an initial position on said magnetic reluctance element and then increasing accordingly as the magnet moves toward an end position on the magnetic reluctance element; and lock means for stopping the operation of said adjusting means, the lock means being arranged to operate when the difference between the aperture signal produced from said output terminal and the computed aperture value signal obtained through exposure computation reaches the predetermined value after comparison of the two signals.

2. An aperture information input device for a camera which compares a computed aperture value signal obtained through exposure computation with a preset aperture signal representing a preset aperture value to be adjusted to determine the aperture of a photograph taking lens when the difference between the two signals reaches a predetermined value in a shutter preference mode and which requires an aperture value signal representing a preset aperture value obtained by a setting operation for carrying out shutter time computation in an aperture preference mode, the aperture information input device comprising:

a diaphragm device provided with a diaphragm and diaphragm aperture preset means;

manual setting means for manually setting a preset aperture value of said diaphragm aperture preset means, said manual setting means being shiftable between a manual setting permitting position which permits manual setting and a manual setting inhibiting position which does not permit manual setting;

adjusting means for adjusting the present aperture value of said diaphragm aperture preset means;

lock means for locking said adjusting means in a state prior to its operation, the adjusting means being arranged to be unlocked in response to a release operation of the camera;

moving means which moves to a first position when said manual setting means is at the manual setting permitting position and to a second position when said manual setting means is at the manual setting inhibiting position, the moving means being arranged to release said lock means from a locking state thereof by moving to the first position;

first urging means which exerts an urging force for actuating said adjusting means;

second urging means provided between said adjusting means and said moving means, the second urging means being arranged to exert no urging force when said moving means is at its first position and to exert an urging force for actuating said adjusting means when the moving means is at its second position; and aperture signal generating means for generating an aperture signal corresponding to a degree of adjustment effected by said adjusting means, the aperture signal generating means being arranged to generate the aperture signal to be compared with said computed aperture value signal resulting from exposure computation, when said manual setting means is moved to the manual setting inhibiting position in the shutter preference mode, and to generate the aperture value signal required for shutter time computation when the manual setting means is moved to the manual setting permitting position in the aperture preference mode.

3. An aperture information input device according to claim 2, wherein said aperture signal generating means includes:

(a) a magnetic reluctance element;

(b) a magnet measuring in length about one half of the length of said magnetic reluctance element, the magnet being interlocked with said adjusting means to move on the magnetic reluctance element in response to the operation of the adjusting means;

(c) input terminals provided at both ends of said magnetic reluctance element for receiving a voltage input applied thereto; and (d) output terminals provided in the middle part and one end of said magnetic reluctance element for producing a voltage output as an aperture signal, the voltage output becoming the lowest when said magnet is at an initial position on said magnetic reluctance and then increasing accordingly as the magnet moves toward an end position on the magnetic reluctance element.

4. An aperture information input device according to claim 2, wherein said first and second urging means are springs respectively.

5. A diaphragm control device for a camera which comprises:

exposure computing means for generating a diaphragm signal;

diaphragm adjusting means which operates in association with a release action of the camera;

signal generating means for generating a digital signal corresponding to adjusting operation of the diaphragm adjusting means, said signal generating means having combination means for optically combining a light emitter, a light shielding plate with an opening and a light receiver and having a hood surrounding the light emitter, said hood being designed to lead the light of the light emitter to the light receiver, said combination means being designed to generate a digital signal when the relative position of the light emitter, the light shielding plate and the light receiver changes corresponding to the adustment by the diaphragm adjusting means, and the digital signal from the combination means being provided as a signal output from the signal generating means;

lock means for stopping the operation of the diaphragm adjusting means; and comparison means for comparing the diaphragm signal with the digital signal of the signal generating means, said comparison means actuating the lock means when the difference between the two signals reaches a predetermined value.

6. A device according to claim 5, in which the diaphragm signal from exposure computing means is a digitized signal.

7. A device according to claim 5, in which the combination means has an opening for introducing the light from the light emitting means to the light receiving means.

* * * * *